United States Patent
Lin et al.

(10) Patent No.: US 10,976,874 B1
(45) Date of Patent: Apr. 13, 2021

(54) CONTROL CIRCUIT AND OPERATING SYSTEM UTILIZING THE SAME

(71) Applicant: Nuvoton Technology Corporation, Hsinchu (TW)

(72) Inventors: Jen-Lieh Lin, Hsinchu County (TW); Cheng-Chih Wang, Jhubei (TW); Chuang-Huang Kuo, Hsinchu (TW); Yan-Chin Huang, Miaoli County (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 0 days.

(21) Appl. No.: 16/728,667

(22) Filed: Dec. 27, 2019

(30) Foreign Application Priority Data

Oct. 25, 2019  (TW) .................................. 108138533

(51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ................... H02M 1/08; H02M 1/088; H02M 2001/0009; H02M 2001/0045; H02M 2001/0048; H02M 3/158
See application file for complete search history.

(56) References Cited

U.S. PATENT DOCUMENTS

2017/0192563 A1*  7/2017  Liao ...................... G06F 3/047
2018/0284928 A1* 10/2018  Kremin ................ G06F 3/0446

FOREIGN PATENT DOCUMENTS

CN      107957809 A    4/2018
TW      201809989 A    3/2018

OTHER PUBLICATIONS

Office Action issued in corresponding TW application No. 108138533 dated May 20, 2020 (with Search Report attached thereto).

\* cited by examiner

*Primary Examiner* — Insa Sadio
(74) *Attorney, Agent, or Firm* — Muncy, Geissler, Olds & Lowe, P.C.

(57) ABSTRACT

A control circuit including an input-output pin, an image driver, a sensing circuit, a first path, a second path and a microcontroller circuit is provided. The input-output pin is configured to be coupled to the first pin of a display device and the second pin of a capacitive touch device. The image driver is configured to provide a driving signal. The sensing circuit determines whether the capacitive touch device is touched according to the voltage of the second pin. The microcontroller circuit turns on the first path and turns off the second path to transmit the driving signal to the display device via the input-output pin in a first operation period. The microcontroller circuit turns on the second path and turns off the first path to transmit the voltage of the second pin to the sensing circuit via the input-output pin in a second operation period.

20 Claims, 4 Drawing Sheets

US 10,976,874 B1

CONTROL CIRCUIT AND OPERATING SYSTEM UTILIZING THE SAME

CROSS REFERENCE TO RELATED APPLICATIONS

This Application claims priority of Taiwan Patent Application No. 108138533, filed on Oct. 25, 2019, the entirety of which is incorporated by reference herein.

BACKGROUND OF THE INVENTION

Field of the Invention

The invention relates to a control circuit, and more particularly to a control circuit that is coupled to a display device and a touch device.

Description of the Related Art

With technological development, the types and functions of electronic devices have increased. Generally, each electronic device has at least one input device and at least one output device. A control device in a corresponding electronic device controls the operation of the electronic device according to the information received by the input device. The control device displays the corresponding image via the output device. The touch device is a common input device. The display device is a common output device. However, since the touch device and the display device have more input-output pins, the number of pins in the control device must be greater than the sum of the number of input-output pins in the touch device and the display device so that the control device can be coupled to the touch device and the display device. Therefore, the space in the electronic device is reduced.

BRIEF SUMMARY OF THE INVENTION

In accordance with an embodiment, a control circuit comprises an input-output pin, an image driver, a sensing circuit, a first path, a second path and a microcontroller circuit. The input-output pin is configured to be coupled to a first pin of a display device and a second pin of a capacitive touch device. The image driver is configured to provide a driving signal. The sensing circuit determines whether the capacitive touch device is touched according to a voltage of the second pin. The first path is coupled between the image driver and the input-output pin. The second path is coupled between the sensing circuit and the input-output pin. The microcontroller circuit turns on the first path and turns off the second path to transmit the driving signal to the display device via the input-output pin in a first operation period. The microcontroller circuit turns on the second path and turns off the first path to transmit the voltage of the second pin to the sensing circuit via the input-output pin in a second operation period.

In accordance with another embodiment, an operating system comprises a display device, a capacitive touch device and a control circuit. The display device comprises a first pin. The capacitive touch device comprises a second pin. The control circuit comprises an input-output pin, an image driver, a sensing circuit, a first path, a second path and a microcontroller circuit. The input-output pin is coupled to the first pin and the second pin. The image driver is configured to generate a driving signal. The sensing circuit determines whether the capacitive touch device is touched according to a voltage of the second pin. The first path is coupled between the image driver and the input-output pin. The second path is coupled between the sensing circuit and the input-output pin. The microcontroller circuit turns on the first path and turns off the second path to transmit the driving signal to the display device via the input-output pin in a first operation period. The microcontroller circuit turns on the second path and turns off the first path to transmit the voltage of the second pin to the sensing circuit via the input-output pin in a second operation period.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

Figure 1:
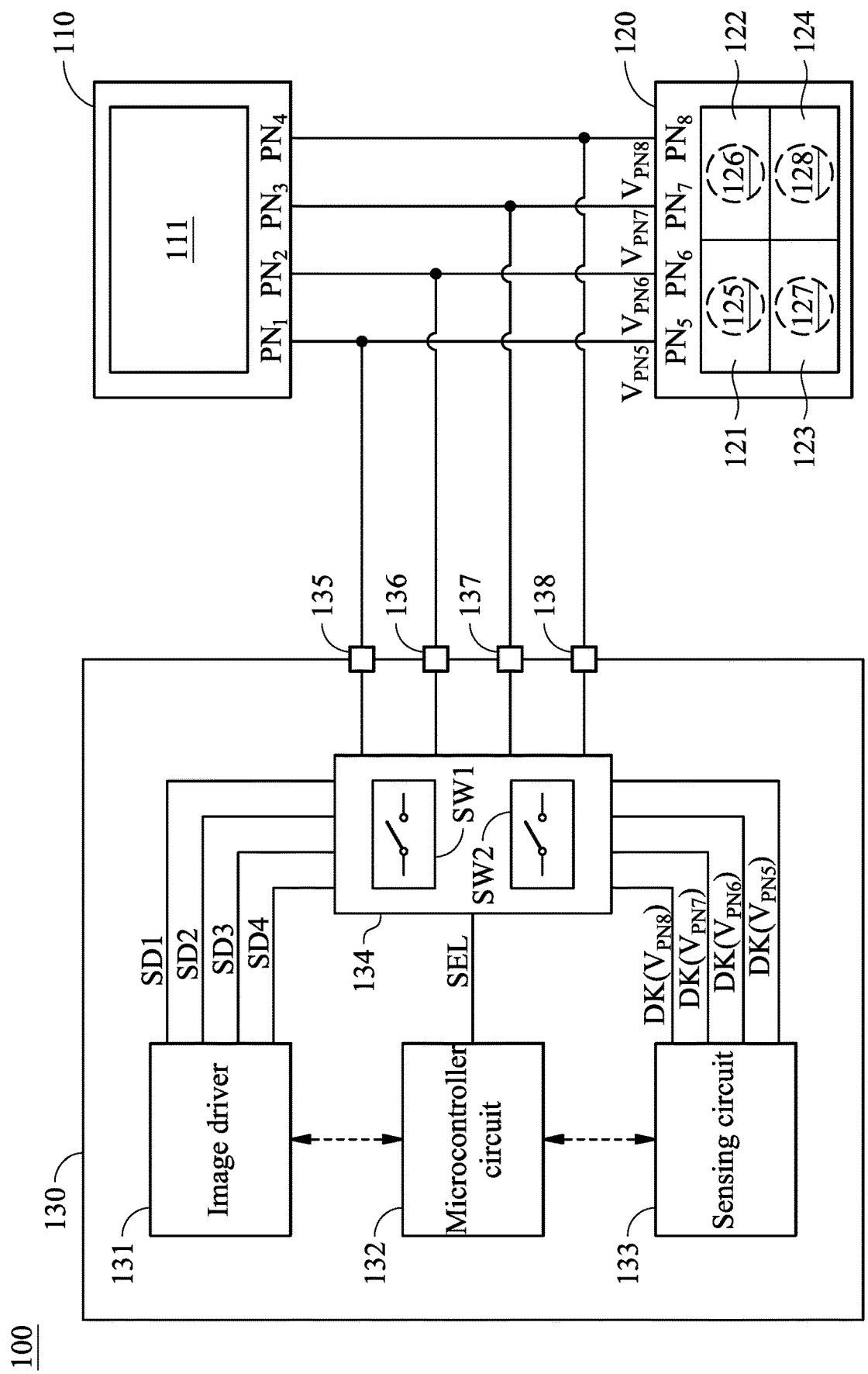
FIG. 1 is a schematic diagram of an exemplary embodiment of an operating system, according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of an operating system, according to various aspects of the present disclosure. As shown in FIG. 1, the operating system 10 comprises a display device 110, a capacitive touch device 120 and a control circuit 130. The display device 110 comprises pins $PN_1$~$PN_4$ and a display area 111. The display area 111 displays an image according to the voltage levels of the pins $PN_1$~$PN_4$. The number of pins of the display device 110 is not limited in the present disclosure. Additionally, the invention is not limited to the kind of display device 110. In one embodiment, the display device 110 is a super twisted liquid crystal display (STN LCD) panel.

The capacitive touch device 120 comprises areas 121~124, sensing elements 125~128 and pins $PN_5$~$PN_8$, but the disclosure is not limited thereto. In other embodiment, the capacitive touch device 120 may comprise more or fewer areas, sensing elements and pins. The invention is not limited to the kind of capacitive touch device 120. In one embodiment, the capacitive touch device 120 is a touch keyboard or a touch pad.

In this embodiment, the sensing element 125 is disposed in the area 121 to determine whether the area 121 is touched, the sensing element 126 is disposed in the area 122 to determine whether the area 122 is touched, the sensing element 126 is disposed in the area 123 to determine whether the area 123 is touched, and the sensing element 128 is disposed in the area 124 to determine whether the area 124 is touched. In one embodiment, the sensing elements 125~128 are capacitive sensors. The pin $PN_5$ outputs the sensing result generated by the sensing element 125. The pin $PN_6$ outputs the sensing result generated by the sensing element 126. The pin $PN_7$ outputs the sensing result generated by the sensing element 127. The pin $PN_8$ outputs the sensing result generated by the sensing element 128. Taking the sensing element 125 as an example, when the area 121 is not touched, the capacitance of the sensing element 125 is not changed. Therefore, the voltage $V_{PN5}$ of the pin $PN_5$ is equal to a reference voltage. However, when the area 121 is touched, the capacitance of the sensing element 125 is changed (e.g., increase). Therefore, voltage $V_{PN5}$ of the pin $PN_5$ is not equal to the reference voltage, for example, the voltage $V_{PN5}$ of the pin $PN_5$ may be less than the reference voltage.

The control circuit 130 comprises an image driver 131, a microcontroller circuit 132, a sensing circuit 133, a transmission circuit 134 and an input-output pins 135~138. The image driver 131 is configured to drive the display device 110. In this embodiment, the image driver 131 generates driving signals SD1~SD4, but the disclosure is not limited thereto. In other embodiments, the image driver 131 may generate more or fewer driving signals. The structure of the image driver 131 is not limited in the present disclosure. In one embodiment, the image driver 131 is a LCD driver. In another embodiment, the image driver 131 is a COM/SEG driver to generate COM/SEG wave.

The sensing circuit 133 is configured to determine whether the capacitive touch device 120 is touched and the touched position. The invention does not limit how the sensing circuit 133 determines whether the capacitive touch device 120 is touched. In one embodiment, the sensing circuit 133 first provides a reference voltage DK to the pins $PN_5$~$PN_8$ of the capacitive touch device 120 and then detects whether the voltage levels of the pins $PN_5$~$PN_8$ are changed. When one voltage level is changed, it means that the corresponding area is touched. For example, when the voltage $V_{PN5}$ of the pin $PN_5$ is not equal to the reference voltage DK, it means that the area 121 corresponding to the pin $PN_5$ is touched. On the contrary, when the voltage $V_{PN5}$ of the pin $PN_5$ is equal to the reference voltage DK, it means that the area 121 corresponding to the pin $PN_5$ is not touched.

The transmission circuit 134 comprises switching circuits SW1 and SW2. The switching circuit SW1 is coupled between the image driver 131 and the input-output pins 135~138 and controlled by a switching signal SEL. When the switching signal SEL turns on the switching circuit SW1, the switching circuit SW1 transmits the driving signals SD1~SD4 to the input-output pins 135~138. At this time, the input-output pins 135~138 serve as output pins to output the driving signals SD1~SD4 to the display device 110.

The switching circuit SW2 is coupled between the sensing circuit 133 and the input-output pins 135~138 and controlled by the switching signal SEL. When the switching signal SEL turns on the switching circuit SW2, the switching circuit SW2 may transmit the reference voltage DK to the input-output pins 135~138 and then transmit the voltages $V_{PN5}$~$V_{PN8}$ of the pins $PN_5$~$PN_8$ to the sensing circuit 133.

In this embodiment, the input-output pins 135~138 are configured to transmit analog signals. In other words, the driving signals SD1~SD4 and the voltages $V_{PN5}$~$V_{PN8}$ are analog signals. Additionally, in the embodiment, the display device 110 and the capacitive touch device 120 share the input-output pins 135~138. Therefore, the number of input-output pins of the control circuit 130 can be reduced. In other embodiments, the display device 110 and the capacitive touch device 120 share more or fewer input-output pins.

Since the features of the input-output pins 135~138 are the same, the input-output pin 135 is given as an example. As shown in FIG. 1, the input-output pin 135 is coupled to the pin $PN_1$ of the display device 110 and the pin $PN_5$ of the capacitive touch device 120. When the switching circuit SW1 is turned on, the input-output pin 135 transmits the driving signal SD1. When the switching circuit SW2 is turned on, the input-output pin 135 transmits the reference voltage DK and the voltage $V_{PN5}$ of the pin $PN_5$.

In one embodiment, the voltages $V_{PN5}$~$V_{PN8}$ of the pins $PN_5$~$PN_8$ are one-third or one-quarter of the amplitudes of the driving signals SD1~SD4. Therefore, even if the pins $PN_5$~$PN_8$ are coupled to the pins $PN_1$~$PN_4$, the voltages $V_{PN5}$~$V_{PN8}$ of the pins $PN_5$~$PN_8$ do not affect the image displayed on the display device 110.

For example, assume that the peak voltage of each of the driving signals SD1~SD4 is 4V. In this case, the peak value of each of the voltages $V_{PN5}$~$V_{PN8}$ of the pins $PN_5$~$PN_8$ is about 1.3V (i.e., one-third of the peak voltage of each of the driving signals SD1~SD4) or about 1V (i.e., one-quarter of the peak voltage of the driving signal SD1. Since the voltages $V_{PN5}$~$V_{PN8}$ of the pins $PN_5$~$PN_8$ are small, the image displayed on the display device 110 does not be interfered by the voltages $V_{PN5}$~$V_{PN8}$ of the pins $PN_5$~$PN_8$. In other embodiments, the voltages $V_{PN5}$~$V_{PN8}$ of the pins $PN_5$~$PN_8$ are less than 1V.

The microcontroller circuit 132 generates the switching signal SEL to control the switching circuits SW1 and SW2. In this embodiment, the switching circuits SW1 and SW2 are not simultaneously turned on. For example, when the microcontroller circuit 132 turns on the switching circuit SW1, the microcontroller circuit 132 does not turn on the switching circuit SW2. When the microcontroller circuit 132 turns on the switching circuit SW2, the microcontroller circuit 132 does not turn on the switching circuit SW1.

The structure of microcontroller circuit 132 is not limited in the present disclosure. In one embodiment, the microcontroller circuit 132 is a microcontroller unit (MCU). In this embodiment, the microcontroller circuit 132 utilizes a single switching signal (e.g., SEL) to control the switching circuits SW1 and SW2, but the disclosure is not limited thereto. In other embodiments, the microcontroller circuit 132 utilizes two switching signals to control the switching circuits SW1 and SW2 respectively.

In other embodiments, the microcontroller circuit 132 further triggers the image driver 131 and the sensing circuit 133. When the image driver 131 is triggered, the image driver 131 generates the driving signals SD1~SD4. At this time, the microcontroller circuit 132 utilizes the switching signal SEL to turn on the switching circuit SW1 and turn off the switching circuit SW2. Therefore, the input-output pins 135~138 output the driving signals SD1~SD4 to the display device 110. The display device 110 displays an image according to the driving signals SD1~SD4.

When the microcontroller circuit 132 triggers the sensing circuit 133, the sensing circuit 133 generates the reference voltage DK. At this time, the microcontroller circuit 132 utilizes the switching signal SEL to turn on the switching circuit SW2 and turn off the switching circuit SW1. Therefore, the input-output pins 135~138 first output the reference voltage DK to the capacitive touch device 120 and then provide the voltages $V_{PN5}$~$V_{PN8}$ of the pins $PN_5$~$PN_8$ to the sensing circuit 133. In this case, the sensing circuit 133 determines whether any of the areas 121~124 is touched according to the voltages $V_{PN5}$~$V_{PN8}$ of the pins $PN_5$~$PN_8$.

In other embodiments, when the microcontroller circuit 132 triggers the sensing circuit 133, the microcontroller circuit 132 may direct the image driver 131 to stop generating the driving signals SD1~SD4. In some embodiments, the image driver 131 may still generate the driving signals SD1~SD4. However, since the microcontroller circuit 132 turns off the switching circuit SW1, the switching circuit SW1 does not transmit the driving signals SD1~SD4 to the input-output pins 135~138. In this case, since the display device 110 has charge storage elements, if the display device 110 does not receive the driving signals SD1~SD4, the display device 110 is capable of maintaining the image.

In this embodiment, the duration which the switching circuit SW2 is turned on is shorter than the duration which the switching circuit SW1 is turned on. For example, the duration which the switching circuit SW2 is turned on may be one tenth of the duration which the switching circuit SW1 is turned on. Therefore, even if the switching circuit SW1 briefly stops transmitting the driving signals SD1~SD4, the image displayed on the display device 110 does not be interfered by the voltages $V_{PN5}$~$V_{PN8}$ of the pins $PN_5$~$PN_8$. In one embodiment, the duration which the switching circuit SW1 is turned on is about 250 us, and the duration which the switching circuit SW2 is turned on is about 250 ns.

Additionally, since the voltages $V_{PN5}$~$V_{PN8}$ of the pins $PN_5$~$PN_8$ are small, even if the display device 110 receives the voltages $V_{PN5}$~$V_{PN8}$ of the pins $PN_5$~$PN_8$, the image displayed on the display device 110 does not be interfered by the voltages $V_{PN5}$~$V_{PN8}$ of the pins $PN_5$~$PN_8$. In one embodiment, the voltages $V_{PN5}$~$V_{PN8}$ of the pins $PN_5$~$PN_8$ may be lower than one-third of the driving signals SD1~SD4. In another embodiment, the voltages $V_{PN5}$~$V_{PN8}$ of the pins $PN_5$~$PN_8$ may be lower than one-quarter of the driving signals SD1~SD4. In other embodiments, the voltages $V_{PN5}$~$V_{PN8}$ of the pins $PN_5$~$PN_8$ are lower than 1V.

The invention does not limit when the microcontroller circuit 132 turns on the switching circuit SW2. Assume that the display device 110 displays many frames in 1 sec. In one embodiment, the microcontroller circuit 132 turns on the switching circuit SW2 between two frames. In another embodiment, the microcontroller circuit 132 turns on the microcontroller circuit 132 at least one time when the display device 110 displays one frame.

Figure 2:
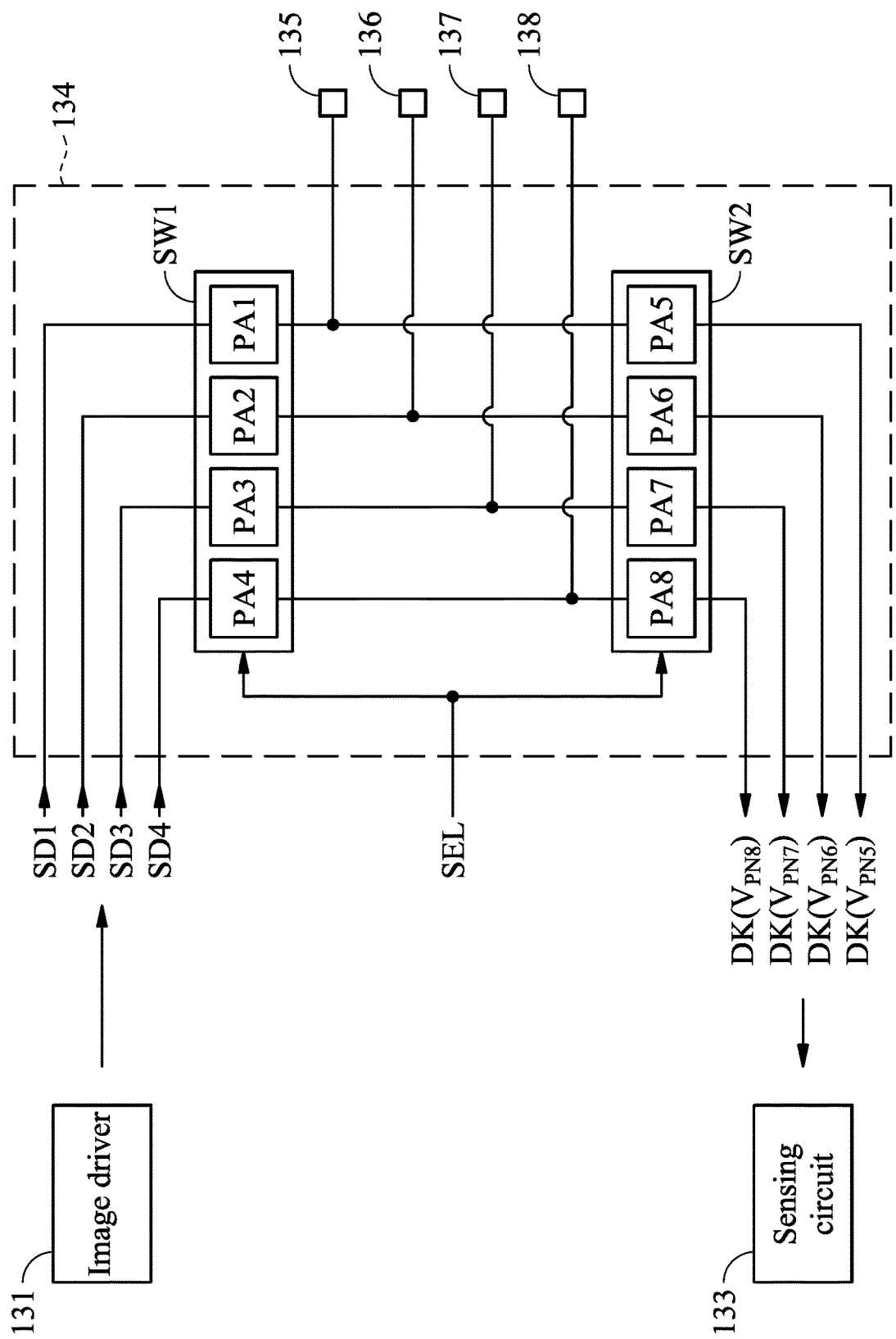
FIG. 2 is a schematic diagram of an exemplary embodiment of a transmission circuit, according to various aspects of the present disclosure.

FIG. 2 is a schematic diagram of an exemplary embodiment of the transmission circuit 134, according to various aspects of the present disclosure. As shown in FIG. 2, the switching circuit SW1 is coupled between the image driver 131 and the input-output pins 135~138 and comprises paths PA1~PA4. In this embodiment, the paths PA1~PA4 transmit the driving signals SD1~SD4 to the input-output pins 135~138 according to the switching signal SEL.

For example, when the switching signal SEL turns on the paths PA1~PA4, the paths PA1~PA4 transmit the driving signals SD1~SD4 to the input-output pins 135~138. When the switching signal SEL does not turn on the paths PA1~PA4, the paths PA1~PA4 stop transmitting the driving signals SD1~SD4 to the input-output pins 135~138. The structure of switching circuit SW1 is not limited in the present disclosure. In one embodiment, the switching circuit SW1 comprises a plurality of switches to form the paths PA1~PA4. In this embodiment, the paths PA1~PA4 are simultaneously turned on or off. In other embodiments, when one of the paths PA1~PA4 is turned on, another of the paths PA1~PA4 is turned off.

The switching circuit SW2 comprises paths PA5~PA8. The path PA5 is coupled between the sensing circuit 133 and the input-output pin 135 and transmits the reference voltage DK and the voltage $V_{PN5}$ of the pin $PN_5$ according to the switching signal SEL. The path PA6 is coupled between the sensing circuit 133 and the input-output pin 136 and transmits the reference voltage DK and the voltage $V_{PN6}$ of the pin $PN_6$ according to the switching signal SEL. The path PA7 is coupled between the sensing circuit 133 and the input-output pin 137 and transmits the reference voltage DK and the voltage $V_{PN7}$ of the pin $PN_7$ according to the switching signal SEL. The path PA8 is coupled between the sensing circuit 133 and the input-output pin 138 and transmits the reference voltage DK and the voltage $V_{PN8}$ of the pin $PN_8$ according to the switching signal SEL. For example, when the switching signal SEL turns on the paths PA5~PA8, the paths PA5~PA8 first transmit the reference voltage DK to the input-output pins 135~138 and then transmit the voltages $V_{PN5}$~$V_{PN8}$ of the pins $PN_5$~$PN_8$ to the sensing circuit 133. When the switching signal SEL turns off the paths PA5~PA8, the paths PA5~PA8 stop transmitting the reference voltage DK and the voltages $V_{PN5}$~$V_{PN8}$ of the pins $PN_5$~$PN_8$. In this embodiment, the paths PA5~PA8 may be turned on or off simultaneously. In other embodiments, when one of the paths PA5~PA8 is turned on, another of the paths PA5~PA8 is turned off.

In one embodiment, the paths coupled to the same input-output pin are not simultaneously turned on. Taking the input-output pin 135 as an example, the input-output pin 135 is coupled to the paths PA1 and PA5. In this case, when the path PA1 is turned on, the path PA5 is turned off. When the path PA5 is turned on, the path PA1 is turned off. The structure of the switching circuit SW2 is not limited in the present disclosure. In one embodiment, the switching circuit SW2 comprises a plurality of switches to provide the paths PA5~PA8.

Figure 3:
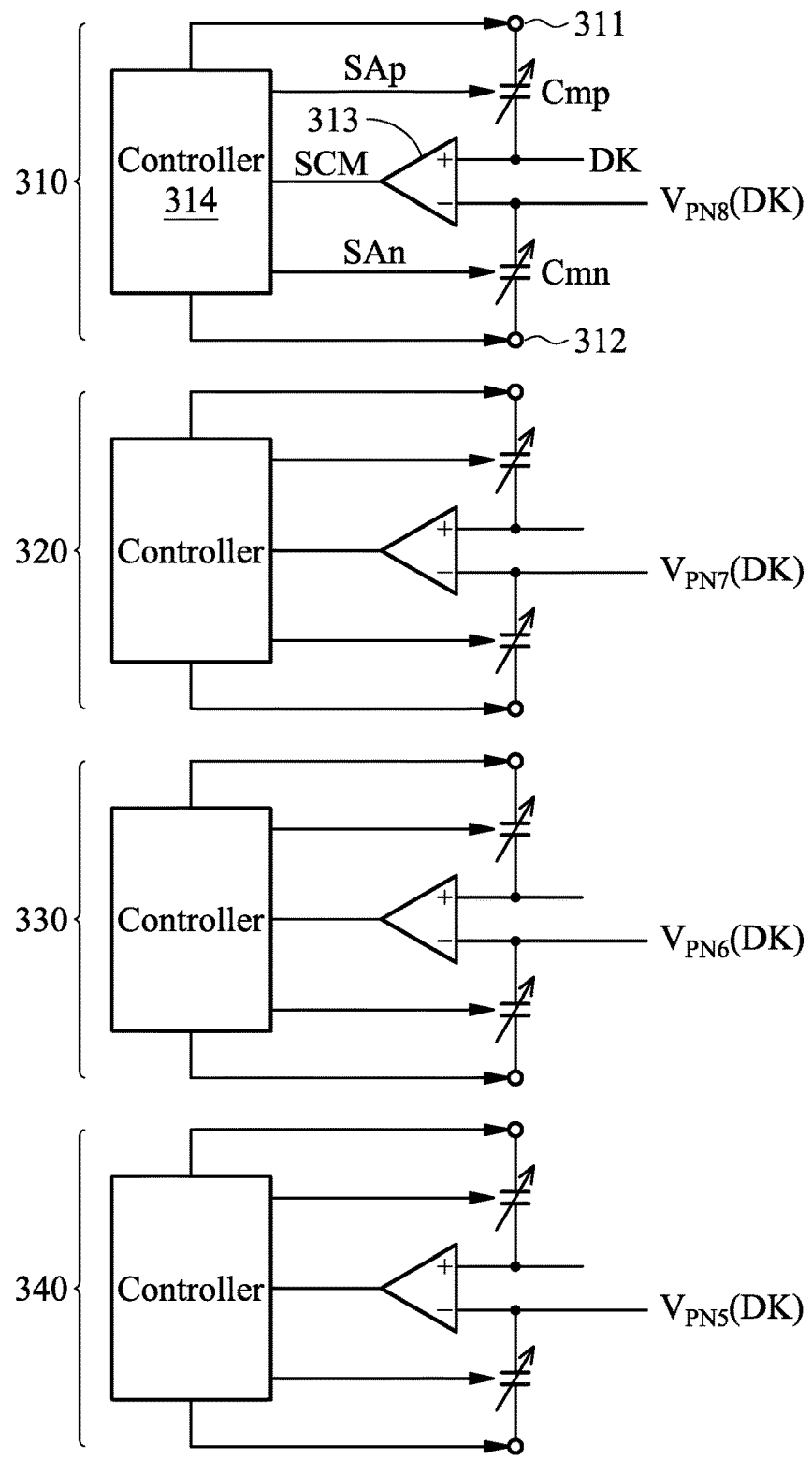
FIG. 3 is a schematic diagram of an exemplary embodiment of a sensing circuit, according to various aspects of the present disclosure.

FIG. 3 is a schematic diagram of an exemplary embodiment of a sensing circuit, according to various aspects of the present disclosure. The sensing circuit 133 comprises sensing units 310~340. The sensing unit 310 determines whether the area 121 of the display device 110 is touched. The sensing unit 320 determines whether the area 122 of the display device 110 is touched. The sensing unit 330 determines whether the area 123 of the display device 110 is touched. The sensing unit 340 determines whether the area 124 of the display device 110 is touched. Since the features of the sensing units 310~340 are the same, the sensing unit 310 is given as an example.

The sensing unit 310 comprises capacitors Cmp and Cmn, a comparator 313 and a controller 314. The capacitor Cmp is coupled between the node 311 and the non-inverted input of the comparator 313 to provide the reference voltage DK. The capacitor Cmn is coupled between the inverted input of the comparator 313 and the node 312. In other embodiments, the capacitor Cmn may be coupled to the inverted input of the comparator 313 and the node 311. In this embodiment, the capacitors Cmp and Cmn are variable capacitors.

The non-inverted input of the comparator 313 is coupled to the capacitor Cmp to receive the reference voltage DK. The inverted input of the comparator 313 receives the voltage $V_{PN8}$ of the pin $PN_8$ and is coupled to the capacitor Cmn. In this embodiment, the comparator 313 compares the reference voltage DK and the voltage $V_{PN8}$ to generate a compared signal SCM.

The controller 314 determines whether a specific area (e.g., the area 124) of the capacitive touch device 120 is touched according to the compared signal SCM. In one embodiment, the controller 314 first generates the reference voltage DK and provides the reference voltage DK to the non-inverted input of the comparator 313. Then, the controller 314 determines whether a specific area of the capacitive touch device 120 is touched according to the voltage of the inverted input of the comparator 313. In this embodiment, the controller 314 obtains the touch pressure according to the voltage of the inverted input of the comparator 313.

For example, in an initial period, the controller 314 first provides a predetermined voltage to the nodes 311 and 312. Therefore, the capacitors Cmp and Cmn start to store charge to generate the reference voltage DK. At this time, the voltages at the inverted input and the non-inverted input of the comparator 313 are equal to the reference voltage DK. If the switching circuit SW2 is turned on, the switching circuit SW2 transmits the reference voltage DK to the pins $PN_5$~$PN_8$ of the capacitive touch device 120.

In such cases, when the area 124 of the capacitive touch device 120 is touched, the capacitance of the sensing element 128 in the area 124 is changed such that the voltage $V_{PN8}$ of the pin $PN_8$ is changed and is not equal to the reference voltage DK. Since the voltage (i.e., $V_{PN8}$) of the inverted input of the comparator 313 is not equal to the voltage (DK) of the non-inverted input, the controller 314 obtains that the area 124 is touched.

In one embodiment, the controller 314 generates adjustment signals Sap and San to adjust the capacitances of the capacitors Cmp and Cmn such that the voltage of the inverted input of the comparator 313 is equal to the voltage (DK) of the non-inverted input of the comparator 313. After the voltage of the inverted input of the comparator 313 is equal to the voltage of the non-inverted input of the comparator 313, the controller 314 obtains the touch strength according to the amplitude of the capacitance of the capacitors Cmp and Cmn being adjusted. In one embodiment, the controller 314 generates a notification signal to notify the microcontroller circuit 132 that a touch event occurs.

Figure 4:
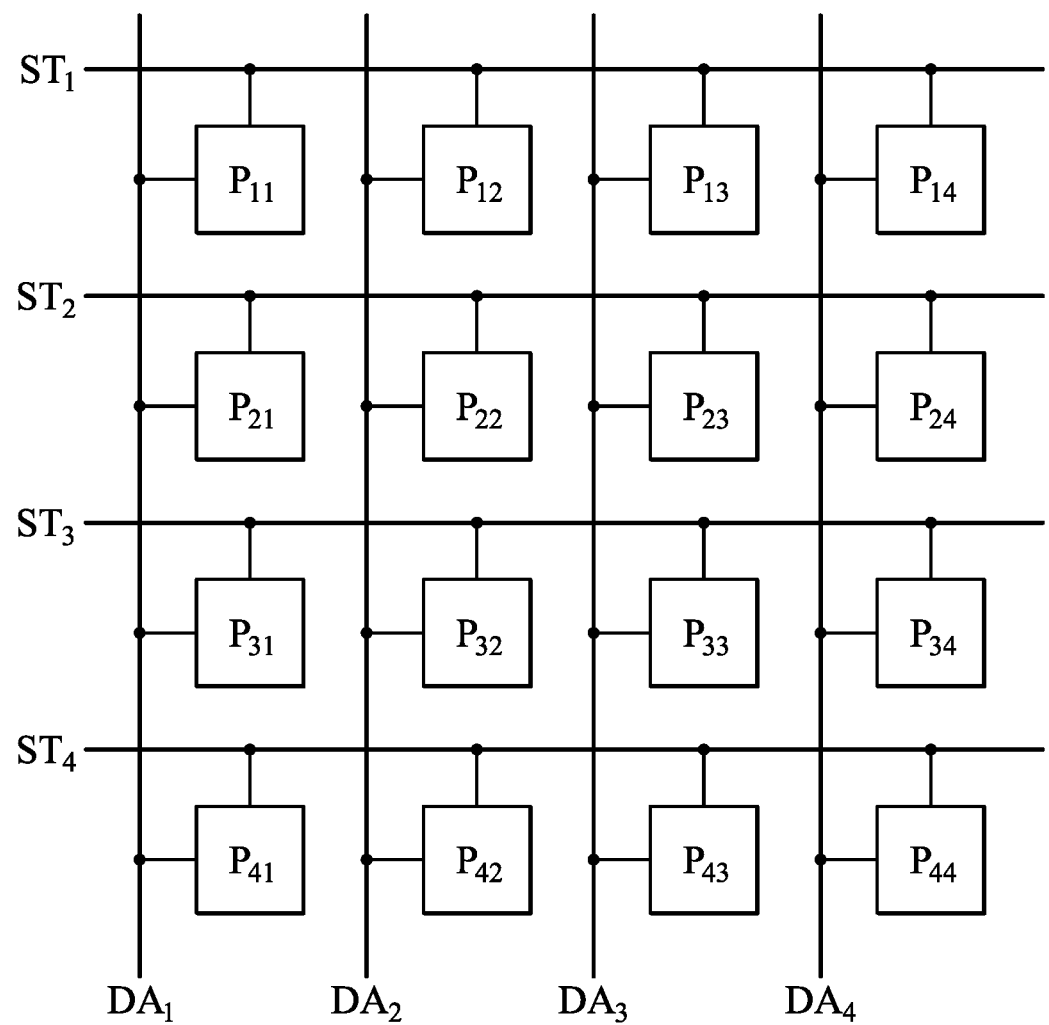
FIG. 4 is a schematic diagram of an exemplary embodiment of a display device, according to various aspects of the present disclosure.

FIG. 4 is a schematic diagram of an exemplary embodiment of the display device 100, according to various aspects of the present disclosure. As shown in FIG. 4, the display device 100 comprises pixels $P_1$~$P_{44}$, but the disclosure is not limited thereto. In other embodiments, the display device 100 comprises more or fewer pixels. In this embodiment, the pixels $P_{11}$~$P_4$ receive and store data signals $DA_1$~$DA_4$ according to turn-on signals $ST_1$~$ST_4$. Taking the pixel $P_{11}$ as an example, the pixel $P_{11}$ receives and stores the data signal $SD_1$ according to the turn-on signal $ST_1$.

In one embodiment, the turn-on signals $ST_1$~$ST_4$ are driving signals SD1~SD4. In this case, the data signals $DA_1$~$DA_4$ may be generated by the image driver 131. The image driver 131 provides the data signals $DA_1$~$DA_4$ to the display device 110 via other input-output pins. These input-output pins transmitting the data signals $DA_1$~$DA_4$ may be coupled to or not coupled to the capacitive touch device 120.

In another embodiment, the data signals $DA_1$~$DA_4$ are the driving signals SD1~SD4. In this case, the image driver 131 may provide the turn-on signals $ST_1$~$ST_4$ to the display device 110 via other input-output pins. These input-output pins transmitting the turn-on signals $ST_1$~$ST_4$ may be coupled to or not coupled to the capacitive touch device 120.

In other embodiments, the driving signals SD1~SD4 are COM/SEG signals. In this case, the pixels $P_{11}$~$P_{44}$ receive and store the data signals $DA_1$~$DA_4$ according to the turn-on signals $ST_1$~$ST_4$ and the COM/SEG signals.

In some embodiments, the display device 110 further comprises a driving circuit (not shown). In this case, the driving circuit may generate the turn-on signals $ST_1$~$ST_4$ or the data signals $DA_1$~$DA_4$ according to the driving signals SD1~SD4. In other embodiments. The driving circuit of the display device 110 generates the turn-on signals $ST_1$~$ST_4$ and the data signals $DA_1$~$DA_4$ according to the driving signals SD1~SD4.

In this embodiment, since the display device 110 and the capacitive touch device 120 share the input-output pins (e.g., 135~138), the number of input-output pins of the control circuit 130 is reduced. Furthermore, since the voltages $V_{PN5}$~$V_{PN8}$ of the pins $PN_5$~$PN_8$ of the capacitive touch device 120 are extremely lower than the voltages of the pins $PN_1$~$PN_4$ of the display device 110, the display device 110 is not interfered by the voltages $V_{PN5}$~$V_{PN8}$. Additionally, the duration which the capacitive touch device 120 outputs the voltages $V_{PN5}$~$V_{PN8}$ is short, the voltages $V_{PN5}$~$V_{PN8}$ do not affect the display device 110.

Unless otherwise defined, all terms (including technical and scientific terms) used herein have the same meaning as commonly understood by one of ordinary skill in the art to which this invention belongs. It should be further understood that terms such as those defined in commonly used dictionaries should be interpreted as having a meaning that is consistent with their meaning in the context of the relevant art and will not be interpreted in an idealized or overly formal sense unless expressly so defined herein.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A control circuit, comprising:
   an input-output pin configured to be coupled to a first pin of a display device and a second pin of a capacitive touch device;
   an image driver configured to provide a driving signal;
   a sensing circuit determining whether the capacitive touch device is touched according to a voltage of the second pin;
   a first path coupled between the image driver and the input-output pin;
   a second path coupled between the sensing circuit and the input-output pin; and
   a microcontroller circuit turning on the first path and turning off the second path to transmit the driving signal to the display device via the input-output pin in a first operation period, and turning on the second path and turning off the first path to transmit the voltage of the second pin to the sensing circuit via the input-output pin in a second operation period.

2. The control circuit as claimed in claim 1, wherein a duration of the second operation period is one tenth of a duration of the first operation period.

3. The control circuit as claimed in claim 1, wherein the voltage of the second pin is one-third or one-quarter of a voltage of the first pin.

4. The control circuit as claimed in claim 1, wherein the voltage of the second pin is less than 1V.

5. The control circuit as claimed in claim 1, wherein the sensing circuit comprises:
- a comparator comprising a non-inverted input, an inverted input and an output, wherein the second path is coupled between the inverted input and the input-output pin;
- a first capacitor coupled between a specific node and the non-inverted input;
- a second capacitor coupled between the specific node and the inverted input; and
- a controller controlling a voltage of the specific node and adjusting a capacitance of the second capacitor according to a voltage of the non-inverted input and a voltage of the inverted input.

6. The control circuit as claimed in claim 1, wherein the input-output pin is configured to transmit an analog signal.

7. The control circuit as claimed in claim 1, wherein the image driver is a COM/SEG driver.

8. The control circuit as claimed in claim 1, wherein in the second operation period, the sensing circuit provides a reference voltage to the second pin and detects the voltage of the second pin.

9. The control circuit as claimed in claim 8, wherein in the first operation period, the microcontroller circuit triggers the image driver to provide the driving signal, and in the second operation period, the microcontroller circuit triggers the sensing circuit to provide the reference voltage to the second pin and detect the voltage of the second pin.

10. The control circuit as claimed in claim 1, wherein a duration of the first operation period is 250 us, and a duration of the second operation period is 250 ns.

11. An operating system comprising:
- a display device comprising a first pin;
- a capacitive touch device comprising a second pin; and
- a control circuit comprising:
    - an input-output pin coupled to the first pin and the second pin;
    - an image driver configured to generate a driving signal;
    - a sensing circuit determining whether the capacitive touch device is touched according to a voltage of the second pin;
    - a first path coupled between the image driver and the input-output pin;
    - a second path coupled between the sensing circuit and the input-output pin; and
    - a microcontroller circuit turning on the first path and turning off the second path to transmit the driving signal to the display device via the input-output pin in a first operation period, and turning on the second path and turning off the first path to transmit the voltage of the second pin to the sensing circuit via the input-output pin in a second operation period.

12. The operating system as claimed in claim 11, wherein a duration of the second operation period is one tenth of a duration of the first operation period.

13. The operating system as claimed in claim 11, wherein the voltage of the second pin is one-third or one-quarter of the voltage of the first pin.

14. The operating system as claimed in claim 11, wherein the voltage of the second pin is less than 1V.

15. The operating system as claimed in claim 11, wherein the sensing circuit comprises:
- a comparator comprising a non-inverted input, an inverted input and an output, wherein the second path is coupled between the inverted input and the input-output pin;
- a first capacitor coupled between a specific node and the non-inverted input;
- a second capacitor coupled between the specific node and the inverted input; and
- a controller controlling a voltage of the specific node and adjusting a capacitance of the second capacitor according to a voltage of the non-inverted input and a voltage of the inverted input.

16. The operating system as claimed in claim 11, wherein the input-output pin is configured to transmit an analog signal.

17. The operating system as claimed in claim 11, wherein the image driver is a COM/SEG driver.

18. The operating system as claimed in claim 11, wherein in the second operation period, the sensing circuit provides a reference voltage to the second pin and detects the voltage of the second pin.

19. The operating system as claimed in claim 18, wherein in the first operation period, the microcontroller circuit triggers the image driver to provide the driving signal, and in the second operation period, the microcontroller circuit triggers the sensing circuit to provide the reference voltage to the second pin and detect the voltage of the second pin.

20. The operating system as claimed in claim 11, wherein a duration of the first operation period is 250 us, and a duration of the second operation period is 250 ns.

* * * * *